United States Patent

Nozawa et al.

Patent Number: 6,110,986
Date of Patent: Aug. 29, 2000

[54] PROPYLENE-BASED POLYMER COMPOSITION AND FOAMED ARTICLE THEREOF

[75] Inventors: Hiroshi Nozawa, Ichihara; Kazuki Wakamatsu, Sodegaura; Tatsuhiro Nagamatsu, Takatsuki, all of Japan

[73] Assignee: Sumitomo Chemical Company, Limited

[21] Appl. No.: 09/208,576

[22] Filed: Dec. 10, 1998

[30] Foreign Application Priority Data

Dec. 11, 1997 [JP] Japan .................................. 9-341279

[51] Int. Cl.⁷ .................................................. C08F 110/06
[52] U.S. Cl. .............................. 521/143; 521/79; 521/80; 521/142; 525/240; 526/348; 526/351
[58] Field of Search ............................. 521/79, 80, 142, 521/143; 525/240; 526/348, 351

[56] References Cited

U.S. PATENT DOCUMENTS

| | | | |
|---|---|---|---|
| 5,134,174 | 7/1992 | Xu et al. | 521/143 |
| 5,236,962 | 8/1993 | Govoni et al. | 521/56 |
| 5,338,764 | 8/1994 | Lesca et al. | 521/60 |
| 5,968,994 | 10/1999 | Hashimoto et al. | 521/143 |

FOREIGN PATENT DOCUMENTS

| | | |
|---|---|---|
| 0 736 552 | 10/1996 | European Pat. Off. |
| WO 94/26794 | 11/1994 | WIPO |
| 97/10300 | 3/1997 | WIPO |

OTHER PUBLICATIONS

JP 05239149 930917 (9342)—See abstract (1993).
JP 06093034 940405 (9418)—See abstract (1994).
JP 55123637 800924 (8045)—See abstract (1980).
JP 59172507 840929 (8445)—See abstract (1984).

*Primary Examiner*—John M. Cooney, Jr.
*Attorney, Agent, or Firm*—Pillsbury Madison & Sutro LLP

[57] ABSTRACT

A propylene-based polymer composition obtained by polymerizing a propylene monomer in the presence of a stereoregular olefin polymerization catalyst system in the first stage to produce a crystalline propylene-based polymer(A) having an intrinsic viscosity of 5 dl/g or more, and successively polymerizing a propylene monomer in the second stage to produce a crystalline propylene-based polymer(B) with an intrinsic viscosity of less than 3 dl/g, wherein the content of the (A) is in the range of 0.05% by weight or more and less than 35% by weight in the total of the polymers(A) and (B), and the total of the polymers(A) and (B) has an intrinsic viscosity of less than 3 dl/g and a Mw/Mn of less than 10, and the foamed article thereof.

15 Claims, No Drawings

PROPYLENE-BASED POLYMER COMPOSITION AND FOAMED ARTICLE THEREOF

BACKGROUND OF THE INVENTION

1. Field of the Invention

The present invention relates to a propylene-based polymer composition excellent in balance of melt strength, elongation characteristics, and fluidity, and a foamed article thereof.

2. Description of the Related Arts

A propylene-based polymer composition obtained by producing a specific crystalline propylene-based polymer in the first stage and another specific crystalline propylene-based polymer in the subsequent stage, has been conventionally known.

For example, JP-A-55-123637 discloses a sheet of a propylene-based polymer composition composed of: a propylene-based polymer component(1) having an intrinsic viscosity of 4.0 dl/g or less, of 60 to 99.5% by weight; and a propylene-based polymer component(2) having an intrinsic viscosity two times or more that of the component(1), of 0.5 to 40% by weight, obtained by two or more-stage polymerization, the intrinsic viscosity of the total components (1) and (2), exceeding 2.0 dl/g.

Also, JP-A-59-172507 discloses a propylene-based polymer composition excellent in processability and mechanical characteristics, obtained by producing a crystalline propylene-based polymer(1) having an intrinsic viscosity of 1.8 to 10 dl/g, of 35 to 65% by weight, in the first stage, and subsequently producing a crystalline propylene-based polymer(2) having an intrinsic viscosity of 0.6 to 1.2 dl/g, of the remaing amount in the second stage.

Further, JP-A-05-239149 discloses, for example, a propylene-based polymer composition excellent in fluidity and elongation, obtained by producing a crystalline propylene-based polymer(1) having an intrinsic viscosity of 4.3 dl/g, of 8% by weight of the total weight, in the first stage, and subsequently producing a crystalline propylene-based polymer(2) having an intrinsic viscosity of 1.18 dl/g, of the remining amount in the second stage.

Moreover, JP-A-06-93034 discloses a propylene-based polymer composition excellent in mechanical characteristics, obtained by producing a crystalline propylene polymer(1) having an intrinsic viscosity of 2.6 dl/g or more, of 10 to 60% by weight of the total weight, in the first stage, and subsequently producing a crystalline propylene-based polymer having an intrinsic viscosity of 1.2 dl/g or less, of the remaining amount, in the second stage, wherein the ratio of the weight average molecular weight to the number average molecular weight(hereinafter, abbreviated as "Mw/Mn") of the propylene-based polymer is more than 20.

EP-A-736552 discloses a polypropylene having a large Mw/Mn and a high flexural modulus.

WO 94/26794 discloses a polypropylene having a broad molecular weight distribution and an excellent melt strength.

However, the above-described references does not disclose any propylene-based polymer composition excellent in all of the melt strength, elongation characteristics, and fluidity.

The fluidity is important in extrusion, foaming, injection molding, or the like of propylene-based polymers. Generally, a resin having a large fluidity tends to be inferior in melt strength and elongation characteristics. Accordingly, a propylene-based polymer having excellent characteristics in all these terms, and being capable of manufacturing with efficiency has been demanded.

SUMMARY OF THE INVENTION

An object of the present invention is to provide a propylene-based polymer composition excellent in balance of melt strength, elongation characteristics and fluidity, and the manufacturing method thereof with efficiency.

The present inventors have intensively studied, as the result, found that the above-described object can be achieved by controlling the intrinsic viscosity and content of each crystalline propylene-based polymer produced in the first stage and the second stage, respectively, and the intrinsic viscosity and Mw/Mn of a propylene-based polymer composition to be finally obtained in a specific range, and reached the present invention.

The present invention provides a propylene-based polymer composition obtained by polymerizing propylene or monomers composed mainly of propylene in the presence of a stereoregular olefin polymerization catalyst system in the first stage to produce a crystalline propylene-based polymer as a component(A)(hereinafter, sometimes abbreviated as "(A)" or "polymer(A)") having an intrinsic viscosity of 5 dl/g or more, and successively polymerizing propylene or monomers composed mainly of propylene in the second stage to produce a crystalline propylene-based polymer as a component(B) (hereinafter, sometimes abbreviated as "(B)" or "polymer(B)") having an intrinsic viscosity of less than 3 dl/g, wherein the content of the (A) is in the range of 0.05% by weight or more and less than 25% by weight, and the total of the (A) and (B) has an intrinsic viscosity of less than 3 dl/g and a Mw/Mn of less than 10.

Further, the present invention provides a foamed article made from the propylene-based polymer composition.

The present invention will be explained in detail below.

DETAILED DESCRIPTION OF THE INVENTION

The propylene-based polymer composition of the present invention is composed of the crystalline propylene-based polymer(A) and the crystalline propylene-based polymer (B), and produced by a multi-stage polymerization method composed of the first and second polymerization stages.

As the crystalline propylene-based polymer(A), an isotactic propylene-based polymer are preferable. Among them, propylene homopolymer, or copolymers of propylene with a monomer other than propylene such as ethylene, an α-olefin having 4 to 12 carbon atoms, or the like in an amount so as not to lose crystallinity, are especially preferred. Examples of the α-olefin include 1-butene, 4-methylpentene-1, 1-octene, 1-hexene and the like, and 1-butene is preferred.

The copolymerization is conducted for the purpose of improving a flexibility, transparency, and the like. The content of the monomer other than propylene in the propylene-based polymer(A) is preferably 10% by weight or less in ethylene when ethylene is used, and 30% by weight or less when the α-olefin is used. The propylene-based polymer(A) is preferably a propylene homopolymer, a random copolymer of propylene of at least 90% by weight and ethylene of 10% by weight or less, a random copolymer of propylene of at least 70% by weight and the α-olefin of 30% by weight or less, or a random copolymer of propylene of at least 60% by weight, ethylene of 10% by weight or less, and the α-olefin of 30% by weight or less, wherein the total of the monomers in the copolymers above is respectively 100% by weight.

As especially preferable crystalline propylene-based polymer component(A) in terms of flexibility and transparency, a random copolymer of propylene in an amount of 90 to 99% by weight and ethylene in an amount in the range of 1 to 10% by weight.

The intrinsic viscosity of the crystalline propylene-based polymer(A) is 5 dl/g or more, preferably 6 dl/g or more, and more preferably 7 dl/g or more. When it is less than 5 dl/g, the propylene-based polymer composition is inferior in melt strength, and hence the object of the present invention is not achieved.

The proportion of the crystalline propylene-based polymer (A) in the total propylene-based polymers (A) and (B) is 0.05% by weight or more and less than 25% by weight, preferably 0.3% by weight or more and less than 20% by weight. When the proportion is less than 0.05% by weight, the melt strength becomes poor. Also, when the amount of (A) is 25% by weight or more, not only the fluidity remarkably decreases, but also the elongation becomes inferior, which makes it impossible to achieve the object of the present invention.

The crystalline propylene-based polymer(B) is a propylene-based polymer produced successively following the production of the crystalline propylene-based polymer (A). That is, it is required to polymerize propylene or monomers mainly composed of propylene in the presence of a stereoregular olefin polymerization catalyst system typified by a Ziegler-Natta catalyst system to produce the crystalline propylene-based polymer(A), and successively polymerize propylene or monomers mainly composed of propylene in the presence of the above catalyst and the polymer(A) to produce a crystalline propylene-based polymer(B). In a mere blend of a crystalline propylene-based polymer having an intrinsic viscosity of 5 dl/g or more and a propylene-based polymer having an intrinsic viscosity of less than 3 dl/g, the melt strength is not improved or insufficiently improved.

Specific examples of the producing method of the propylene-based polymer composition include a batch polymerization method in which, in the same polymerization vessel, (A) is produced by polymerization, followed by production of (B) by polymerization, or a polymerization method in which the polymerization vessels consisting of at least 2 vessels are connected in series, and after producing (A), the product is transferred to the next polymerization vessel, followed by production of (B) in the polymerization vessel.

The intrinsic viscosity of the crystalline propylene-based polymer(B) is less than 3 dl/g, and preferably less than 2 dl/g. When it is 3 dl/g or more, the intrinsic viscosity of the propylene-based polymer composition becomes too high, resulting in inferior fluidity, which entails a problem in processability. Even if the viscosity of the whole mixture is adjusted by addition of other components, there occurs a problem in miscibility and the like. It is noted that the intrinsic viscosity ([η]B) of the crystalline propylene-based polymer(B) is the value calculated from the following expression.

$$[\eta]B=([\eta]T \times 100-[\eta]A \times WA)/WB$$

[η]T: Intrinsic viscosity of the total crystalline propylene-based polymers (A) and (B)

[η]A: Intrinsic viscosity of the crystalline propylene-based polymer(A)

WA: Content (% by weight) of the crystalline propylene-based polymer(A)

WB: Content (% by weight) of the crystalline propylene-based polymer (B)

As the crystalline propylene-based polymer(B), isotactic propylene-based polymers which satisfy the above conditions are preferably used. Among them, a crystalline propylene homopolymers, crystalline copolymers of propylene, ethylene, and an α-olefin having 4 to 12 carbon atoms, or the like, and crystalline copolymers having a structure in which an amorphous ethylene-α-olefin copolymer segment is finely dispersed in a crystalline propylene-based polymer as a matrix, and the like are more preferred.

The content of the monomer other than propylene in the propylene-based polymer(B) is preferably 10% by weight or less in ethylene when ethylene is used, and 30% by weight or less when the α-olefin having 4 to 12 carbon atoms is used. The propylene-based polymer(B) is preferably a propylene homopolymer, a random copolymer of propylene of at least 90% by weight and ethylene of 10% by weight or less, a random copolymer of propylene of at least 70% by weight and the α-olefin having 4 to 12 carbon atoms of 30% by weight or less, or a random copolymer of propylene of at least 60% by weight, ethylene of 10% by weight or less, and the α-olefin having 4 to 12 carbon atoms of 30% by weight or less (the total of the monomer units is 100% by weight). An ethylene content of exceeding 10% by weight, or a content of the α-olefin of exceeding 30% by weight results in loss of most of the crystallinity, which sometimes cause a loss of the value as a product.

Examples of the α-olefin include 1-butene, 4-methylpentene-1, 1-octene, 1-hexene and the like, and 1-butene is preferred.

Examples of especially preferable crystalline propylene-based polymer(B) include a homopolymer of propylene, a random copolymer of propylene and 10% by weight or less of ethylene, a random copolymer of propylene and 30% by weight or less of 1-butene, and random terpolymer of propylene, 10% by weight or less of ethylene and 30% by weight or less of 1-butene.

The intrinsic viscosity of the total polymers (A) and (B) of the present invention must be less than 3 dl/g. When the intrinsic viscosity is 3 dl/g or more, the fluidity of the composition is inferior, which entails a problem in processability. It is preferably in the range of 1 dl/g or more and less than 3 dl/g, and more preferably in the range of 1 dl/g or more and less than 2 dl/g.

The polymer of the present invention is required to have a Mw(weight average molecular weight)/Mn (number average molecular weight)of less than 10, preferably 4 or more and less than 8. When the Mw/Mn is 10 or more, the appearance of the resulting formed article sometimes is inferior, or the elongation characteristics is sometimes markedly reduced.

In the present invention, it is possible to mix the propylene-based polymer composition of the present invention with a crystalline propylene-based polymer having an intrinsic viscosity of less than 3 dl/g as a component(C) (hereinafter, sometimes referred to as "(C)" or "polymer(C)

") produced by a method other than the method for producing the propylene-based polymer composition of the present invention, for example, a known single stage polymerization method. In this mixture (hereinafter, referred to as "propylene polymer composition"), it is also required that the intrinsic viscosity is less than 3 dl/g, preferably less than 2 dl/g, more preferably 1 dl/g or more and less than 2 dl/g, and the Mw/Mn is less than 10, preferably 4 or more and less than 8.

The content of the crystalline propylene-based polymer (A) in the total of (A), (B) and (C) is required to be 0.05% by weight or more and less than 20% by weight.

It is especially preferable that the amount of the crystalline propylene-based polymer (A) satisfies the following expression in terms of melt strength. When the amount of (A) satisfies the following expression, the effect of improving melt strength becomes large.

Content of (A)(% by weight)≧400×EXP(-0.6×intrinsic viscosity(dl/g) of (A))

(wherein EXP(X) represents $e^X$, and e is the base of the natural logarithm.)

When the fluidity is particularly attached importance, so far as the requirement of the melt strength (for example, the expression above) is satisfied, the smaller is the amount of the (A), the more preferable is The propylene-based polymer composition of the present invention can be obtained by using a stereoregular olefin polymerization catalyst system consisting of a solid catalyst (a), an organoaluminum compound(b), and an electron-donative compound(c). Preferable examples of the solid catalyst include a solid catalyst containing Ti, Mg and halogen as essential components. More preferably, the propylene-based polymer(A) is obtained by adopting the catalyst system and producing under conditions giving the polymerization activity that the rate of polymerization at the time of polymerizing monomers is 2000 g or more for every 1 gram of catalyst per hour. It is noted that "1 gram of catalyst" herein means 1 gram of the solid catalyst containing Ti, Mg and halogen as essential components.

As regards the catalyst system, for example, the ones described in Japanese Laid-open Patent Publication No.07-216017 can be preferably used. Concrete examples thereof include a catalyst system consisting of:

(a) a solid catalyst containing a trivalent titanium compound obtained in the following manner: in the presence of an organosilicon compound having a Si—O bond (the preferable one is an alkoxy silane compound expressed by the general formula $Si(OR^1)_m(R^2)_{4-m}$, wherein $R^1$ and $R^2$ independently preferably represent a hydrocarbon group having 1 to 20 carbon atoms, m is preferably a number satisfying $1 \leq m \leq 4$, and a tetraalkoxy silane compound wherein m=4 is especially preferable.) and an ester compound (mono- and polyhydric carboxylic acid esters are used, of which olefin carboxylic acid esters (e.g. methacrylic acid esters, maleic acid esters and phthalic acid esters), and phthalic acid esters are preferable, and diesters of phthalic acid are especially preferable.), a titanium compound expressed by the general formula $Ti(OR^3)_aX_{4-a}$ (wherein $R^3$ represents a hydrocarbon group having 1 to 20 carbon atoms, X represents a halogen atom, and a denotes a number satisfying $0<a\leq4$, preferably $2\leq a\leq4$, and especially preferably a=4.) is reduced with an organomagnesium compound (especially, Grignard compounds, dialkyl magnesium compounds, and diaryl magnesium compounds are preferably used.) to obtain a solid product. The resulting solid product is treated with an ester compound (ester compounds described above are preferable), followed by a treatment with a mixture of an ether compound (dialkyl ethers are used, of which especially dibutyl ether and diisoamyl ether are preferably used) and titanium tetrachloride, or a mixture of an ether compound (similar to as above), titanium tetrachloride, and an ester compound (similar to as above) to obtain a trivalent titanium compound-containing solid catalyst;

(b) an organoaluminum compound (triethylaluminum, triisobutylaluminum, a mixture of triethylaluminum and diethylaluminum chloride, tetraethyldialmoxane, and the like are preferably used); and (c) an electron-donative compound (tert-butyl-n-propyldimethoxysilane, tert-butylethyldimethoxysilane, dicyclopentyldimethoxysilane or the like are preferably used).

As producing conditions of the propylene-based polymer composition of the present invention, the following conditions are used.

That is, for example, the molar ratio of Al atom in the organoaluminum compound (b)/Ti atom in the solid catalyst (a) is usually in the range of 1 to 2000, and preferably in the range of 5 to 1500, and the molar ratio of the electron-donative compound (c)/Al atom in the organoaluminum compound (b) is usually in the range of 0.02 to 500, and preferably in the range of 0.05 to 50.

As a producing method of the propylene-based polymer (A), a solvent polymerization method using an inert solvent typified by a hydrocarbon such as hexane, heptane, octane, decane, cyclohexane, methylcyclohexane, benzene, toluene, or xylene, a bulk polymerization method using a liquid monomer as a solvent, and a gas-phase polymerization method conducted in gaseous monomer can be used. Among them, the bulk polymerization method and gas-phase polymerization method are preferable because of the easiness of post-treatment.

The polymerization temperature in the production of the propylene-based polymer (A) is usually in the range of 20 to 150° C., and preferably in the range of 35 to 95° C. The polymerization within this temperature range is preferable from viewpoint of productivity, and it is also preferable for obtaining the propylene-based polymer composition of (A) and (B) in the desired weight ratio.

Use of the catalyst system and the producing method resulting in that the rate of polymerization at the tire of producing (A) is 2000 g or more for every 1 gram of catalyst per hour achieves highly productive efficiency, and does not cause reduction in heat resistance, coloration, and the like due to the catalyst residue in the polymers. Accordingly, the removal of the catalyst is not required, thus leading to preferable results.

The production of the propylene-based polymer(B) in the second stage, as described above, conceivably includes the case where (A) is produced, followed by production of (B) in the same polymerization vessel, and the case where (A) is produced, after which polymerization is conducted in a different polymerization vessel. In the production of the (B), the second stage may be single polymerization or may be divided into two or more steps so far as the (B) specified as described above can be obtained. Preferably, the polymerization of the second stage is done in a single reactor or in polymerization reactors composed of 2 to 4 polymerization vessels connected in series, and more preferably 2 or 3 polymerization vessels. Also, with respect to the polymerization method, the solvent polymerization method, bulk polymerization method, gas-phase polymerization method, or the polymerization method consisting of the combination thereof can be used. Especially, the bulk polymerization method, gas-phase polymerization method, or the polymerization method consisting of the combination thereof is preferable because of high polymerization activity and easiness of the post-treatment.

Preferably, the rate of polymerization in the production of (B) is adjusted by selecting polymerization conditions so as to be 2 times or more the rate of polymerization in the production of (A) for every 1 gram of catalyst per hour. More preferably, it is three times or more. The polymerization temperature at this stage may be the same as, or different from the polymerization temperature in the production of (A). However, it is usually in the range of 20 to 150° C., and preferably in the range of 35 to 95° C. When the rate of polymerization in the production of (B) is less than two times the rate of polymerization in the production of (A) for every 1 gram of catalyst per hour, not only that the productivity is sometimes inferior, but also it sometimes becomes difficult to achieve the required ratio of (A) and (B) for the polymer composition.

The propylene-based polymer(C) is preferably produced with the catalyst system under the conditions described above.

The propylene-based polymer composition of the present invention is subjected to post-treatment such as deactivation of catalyst, removal of the solvent and unreacted monomers, drying, granulation, and the like, if required, to be provided as product.

The propylene-based polymer composition of the present invention, in such a degree as to maintain the effect of the present invention, may contain, if required, various kinds of additives, for example, such as primary and secondary oxidation inhibitors, ultraviolet absorbers, antistatic agents, nucleating agents, pigments, blowing aids, filler, and the like.

The propylene-based polymer composition of the present invention can be preferably used in a wide range of application such as extrusion molding, injection molding, vacuum forming, foaming, and the like. Among them, it is preferably used for foaming.

For foaming, a method such as extrusion foaming using a volatile solvent or an inorganic gas, chemical foaming using a thermal decomposable blowing agent, or the like can be adopted.

EXAMPLE

The present invention will be explained in detail by way of examples below, but is not limited thereto.
(1) Contents of Propylene-based Polymers (A) and (B)
They were determined from the material balance at the time of polymerization, unless otherwise stated.
(2) Intrinsic Viscosity of Polymer
It was measured using a Ubbelohde viscometer in 135° C. tetralin. The intrinsic viscosity of the propylene-based polymer(B) was determined from the intrinsic viscosities of the propylene-based polymer(A) and the total propylene-based polymers (A) and (B) based on the calculation expression described in the specification.
(3) Comonomer Content
According to the method described on pages 616 and the later of "Polymer Handbook" (1995, published by Kinokuniya Company Ltd.), the measurement was carried out by means of an infrared spectroscopy method to determine the comonomer content.
(4) Mw/Mn Value
By means of GPC (gel permeation chromatography), the measurement was carried out under the following conditions.
Type: 150CV type (manufactured by MILIPOREWATERS Co.)
Column: Shodex M/S 80
Measuring temperature: 145° C.
Solvent: ortho-dichlorobenzene
Sample concentration: 5 mg/8 mL
A calibration curve was made using a standard polystyrene. The Mw/Mn of the standard polystyrene (NBS706: Mw/Mn=2.0) measured under the conditions was found to be in the range of 1.9 to 2.0.
(5) Melt Flow Rate (MFR)
According to JIS K7210, the measurement was carried out at a temperature of 230° C. under a load of 2.16 kgf.
(6) Hot Press Molding
Preparation was carried out by hot press molding (preheating at 230° C. for 5 minutes, followed by molding at 230° C. under 50 Kgf/cm$^2$ for 5 minutes, and cooling at 30° C. under 50 Kgf/cm$^2$ for 5 minutes).
(7) Coloration
Evaluation was carried out by visual judgment of the sheet prepared by hot press molding.
(8) Tensile Elongation
According to JIS K7113, a 1 mm-thick No.2 test piece prepared from the hot press molded sheet was used to conduct a test at a tensile speed of 50 mm/minute, thereby determining the tensile elongation at break. (9) Melt Strength
A heat draw-down test was conducted as follows:
A 1 mm-thick pressed sheet prepared by hot press molding was cut into a piece with a size of 85 mm×85 mm, which was then fixed equally between two 5 mm-thick iron plates each with a rectangular hole of 70 mm×70 mm.

This sample was held in an oven set at 190° C. for 10 minutes, and then taken out to be cooled at room temperature, thus determining the length of the perpendicular from the tip sagging to the pressed sheet.

Example 1

(Synthesis of solid catalyst)
A 200-L reactor equipped with a stirrer, made from stainless steel (SUS) was replaced with nitrogen. Thereafter, 80 L of hexane, 6.55 mole of titanium tetrabutoxide, 2.8 mole of diisobutyl phthalate, and 98.9 mole of tetraethoxysilane were charged therein, resulting in a homogeneous solution. Then, 51 L of n-butylmagnesium chloride with a concentration of 2.1 mole/L in diisobutyl ether solution was gradually added dropwise over 5 hours while maintaining the temperature in the reactor at 5° C. After the dropping was terminated, the mixture was further stirred for 1 hour at room temperature, followed by solid-liquid separation at room temperature. Then, washing with 70 L of toluene was repeated 3 times. Subsequently, toluene was added so that the slurry concentration becomes 0.2 Kg/L, after which 47.6 mole of diisobutyl phthalate was added thereto to effect a reaction at 95° C. for 30 minutes. After the reaction, solid-liquid separation was carried out, and the resulted solid was washed 2 times with toluene. Then, 3.13 mole of diisobutyl phthalate, 8.9 mole of di-n-butyl ether, and 274 mole of titanium tetrachloride were added to effect a reaction at 105° C. for 3 hours. After the reaction was terminated, at the same temperature, the solid-liquid separation was carried out, and the resulted solid was washed 2 times with 90 L of toluene at the same temperature. Subsequently, the slurry concentration was adjusted to 0.4 Kg/L, after which 8.9 mole of di-n-butyl ether and 137 mole of titanium tetrachloride were added to effect a reaction at 105° C. for 1 hour. After the reaction was terminated, at the same temperature, the solid-liquid separation was performed, and then, washing was conducted with 90 L of toluene 3 times at the same temperature. Thereafter, washing was further conducted with 70 L of hexane 3 times, followed by drying under reduced pressure to obtain 11.4 Kg of a solid catalyst. The resulting solid catalyst contained 1.8% by weight of titanium atom, 20.1% by weight of magnesium atom, 8.4% by weight of phthalic acid ester, 0.3% by weight of ethoxy group, and 0.2% by weight of butoxy group, and had a good particle property free from fine powder.

(Pre-activation of solid catalyst)

To an autoclave equipped with a stirrer, with an internal volume of 3 L, made from SUS, sufficiently dehydration- and deaeration-treated, 1.5 L of n-hexane, 37.5 mmol of triethylaluminum, 3.75 mmol of t-butyl-n-propyldimethoxysilane, and 15 g of the above-described solid catalyst were added. While maintaining the temperature in the autoclave at 5 to 15° C., 15 g of propylene was continuously supplied over 30 minutes to perform pre-activation.

(Production of propylene-based polymer(A))

In a polymerization reactor with an internal volume of 300 L made from SUS, while a liquid propylene was supplied at 57 kg/hr. so as to keep the polymerization temperature of 55° C. and the polymerization pressure of 27 kg/cm$^2$G, triethylaluminum at 76.8 mmol/h, t-butyl-n-propyldimethoxysilane at 7.95 mmol/h, and pre-activated solid catalyst at 1.24 g/h were continuously supplied. Thus, the propylene polymerization was conducted substantially in the absence of hydrogen to obtain a polymer at 2.55 kg/h. The amount of a polymer formed was 4100 g for every 1 gram of catalyst per hour. A part of the resulting polymer was subjected to sampling and analyzed. As a result, the intrinsic viscosity was 7.5 dl/g. The produced polymer was transferred into the second reactor without being deactivated.

(Production of propylene-based polymer(B))

In a fluidized bed reactor with an internal volume of 1 m$^3$, equipped with a stirrer, while propylene and hydrogen were supplied so as to keep the polymerization temperature of 80° C., the polymerization pressure of 18 Kg/cm$^2$G, and the hydrogen concentration of 3 vol % in the gas-phase part, propylene polymerization in the presence of the catalyst-containing polymer transferred from the first reactor was successively continued to obtain a polymer composition at 15.9 kg/h. The intrinsic viscosity of thus obtained composition of the polymer (A) and (B) was 2.3 dl/g.

From the above results, the amount of polymer formed at the time of producing (B) was 22000 g for every 1 gram of catalyst per hour, and the weight ratio of polymerized amount in the first reactor to that in the second reactor was 16:84. The intrinsic viscosity of (B) was 1.3 dl/g. Also, the Mw/Mn of the polymer composition was 4.8.

(Pelletization of polymer)

To 100 parts by weight of the polymer particles, 0.1 parts by weight of calcium stearate, 0.05 parts by weight of Irganox® 1010 (manufactured by Ciba-Geigy Ltd.), and 0.2 parts by weight of Sumilizer® BHT (manufactured by Sumitomo Chemical Co., Ltd.) were added and mixed, followed by melt-kneading at 230° C. to obtain pellets with a MFR of 5.1 g/10 min.

Example 2

(Synthesis of solid catalyst)

A solid catalyst was prepared in the same manner as in Example 1.

(Pre-activation of solid catalyst)

A pre-activation of solid catalyst was carried out in the same manner as in Example 1.

(Polymerization of propylene-based polymer(A))

In a polymerization reactor with an internal volume of 300 L made from SUS, a liquid propylene was supplied at 57 kg/h so as to keep the polymerization temperature of 55° C. and the polymerization pressure of 25 kg/cm$^2$G, and ethylene was also supplied so that the ethylene molar fraction in the gas-phase part becomes 1.1%. Triethylaluminum at 74.7 mmol/h, t-butyl-n-propyldimethoxysilane at 7.45 mmol/h, and the pre-activated solid catalyst at 1.04 g/h were continuously supplied. Thus, the propylene-ethylene copolymerization was conducted substantially in the absence of hydrogen to obtain a polymer at 3.53 kg/h. The amount of the polymer formed at this stage was 6800 g for every 1 gram of catalyst per hour. A part of the resulting polymer was subjected to sampling and analyzed. As a result, the intrinsic viscosity was 7.4 dl/g, and the ethylene content was 1.5% by weight. The obtained polymer was transferred into the second reactor without being deactivated.

(Production of propylene-based polymer(B))

In a fluidized-bed reactor having an internal volume of 1 m$^3$, equipped with a stirrer, propylene, hydrogen and ethylene were supplied so as to keep the polymerization temperature of 85° C., the polymerization pressure of 18 Kg/cm$^2$G, the hydrogen concentration of 4 vol % and the ethylene concentration of 2.9 mol % in the gas-phase part, during which propylene-ethylene copolymerization with the catalyst-containing polymer transferred from the first reactor was successively continued to obtain a polymer composition at 23.6 kg/h. The intrinsic viscosity of the polymer composition was 2.3 dl/g, and the ethylene content was 3.8% by weight.

From the above results, the amount of polymers formed at the time of producing (B) was found to be 39,000 g for every 1 gram of catalyst per hour, and the weight ratio of (A) formed in the first reactor to (B) formed in the second reactor was 15:85. The intrinsic viscosity of (B) was 1.4 dl/g, and the ethylene content of (B) was 4.2% by weight. Also, the Mw/Mn of the polymer composition was 5.7.

(Pelletization of the polymer composition)

The polymer composition was pelletized in the same manner as in Example 1. The MER was 4.3 g/10 min.

Comparative Example 1

(Synthesis of solid catalyst)

A solid catalyst was prepared in the same manner as in Example 1.

(Pre-mixing of catalyst)

Under a nitrogen atmosphere, 40 mL of n-heptane, 4.4 mmol of triethylaluminum, 0.44 mmol of t-butyl-n-propyldimethoxysilane, and 4.9 mg of solid catalyst were mixed in this order.

(Production of propylene-based polymer(A))

A 3 L autoclave made from SUS was kept at 20° C. or less, to which pre-mixed solid catalyst was added under reduced pressure. Further, hydrogen was introduced therein by a differential pressure of 70 mmHg. Then, 780 g of propylene was added under pressure, and the autoclave was heated to initiate the polymerization while stirring. The polymerization temperature was kept at 80° C., and the pressure at this stage was 35.5 Kg/cm$^2$G. The polymerization for 30 minutes resulted in 109 g of a polymer, the intrinsic viscosity of the polymer was 5.1 dl/g.
(Production of propylene-based polymer(B))

Following the production of (A), hydrogen was added by a differential pressure of 4.5 Kg/cm$^2$G, and the temperature was kept at 80° C. to continue the polymerization. The pressure at this stage was 40 Kg/cm$^2$G. The polymerization for 30 minutes resulted in 236 g of a polymer in all (polymer composition), and the intrinsic viscosity of the total polymers (polymer composition) was 2.7 dl/g.

From the above results, the amount of (B) was 127 g, and the intrinsic viscosity was 0.6 dl/g. Accordingly, the weight ratio of (A) to (B) was 46:54, the polymerization amount of the polymer formed at the time of producing (A) was 44000 g for every 1 gram of catalyst per hour, while the amount of the polymer formed at the time of producing (B) was 52000 g for every 1 gram of catalyst per hour. Also, the Mw/Mn of the polymer was 5.9.
(Pelletization of polymer)

The polymer composition was pelletized in the same manner as in Example 1. The MFR was 3.0 g/10 min.

Comparative Example 2
(Synthesis of solid catalyst)

A solid catalyst was prepared in the same manner as in Example 1.
(Pre-mixing of catalyst)

Under a nitrogen atmosphere, 40 mL of n-heptane, 4.4 mmol of triethylaluminum, 0.44 mmol of t-butyl-n-propyldimethoxysilane, and 4.5 mg of solid catalyst were mixed in this order.
(Production of propylene-based polymer(A))

A 3 L autoclave made from SUS was kept at 20° C. or less, to which pre-mixed solid catalyst was added under reduced pressure. Further, hydrogen was introduced therein by a differential pressure of 500 mmHg. Then, 780 g of propylene was added under pressure, and the temperature was increased to initiate the polymerization while stirring. The polymerization temperature was kept at 80° C., and the pressure at this stage was 36 Kg/cm$^2$G. The polymerization for 10 minutes resulted in 81 g of a polymer, the intrinsic viscosity was 3.3 dl/g.
(Production of propylene-based polymer(B))

Following the production of (A), hydrogen was added by a differential pressure of 3.0 Kg/cm$^2$G, and the temperature was kept at 80° C. to continue the polymerization. The pressure at this stage was 39 Kg/cm$^2$G. The polymerization for 50 minutes resulted in 255 g of a polymer in all (polymer composition), and the intrinsic viscosity of the total polymers (polymer composition) was 1.9 dl/g.

From the above results, the polymerization amount of (B) was found to be 174 g, and the intrinsic viscosity was 1.2 dl/g. Accordingly, the weight ratio of (A) to (B) was 32:68, the amount of the polymer formed at the time of producing (A) was 108000 g for every 1 gram of catalyst per hour, while the amount of polymer formed at the time of producing (B) was 46000 g for every 1 gram of catalyst per hour.
(Production of added component (propylene-based polymer (C))

In accordance with the production of (B) of Comparative Example 1, the hydrogen concentration was adjusted so that the intrinsic viscosity becomes 2.0 dl/g to obtain a polymer.
(Pelletization of the polymer)

30% by weight of the polymer composition consisting of (A) and (B), and 70% by weight of the polymer of the propylene-based polymer(C) were mixed to conduct pelletization in the same manner as in Example 1. The pellet had an intrinsic viscosity of 1.8 dl/g, a MFR of 5.8 g/10 min., and a Mw/Mn of 3.7.

Comparative Example 3

An experiment was carried out in the following manner according to the example described in Japanese Patent Publication (Kokai) No. 55-123637 (JP-A-55-123637).
(Synthesis of solid catalyst)

A solid catalyst was prepared according to Example 1 described in Japanese Patent Publication (Kokai) No. 54-118486 (JP-A-54-118486).
(Pre-mixing of catalyst)

Under a nitrogen atmosphere, 40 mL of n-heptane, 0.17 $\mu$mol of methyl methacrylate, and 11 mmol of diethylaluminum monochloride, and 50 mg of solid catalyst were mixed in this order.
(Production of propylene-based polymer composition(A))

A 3 L autoclave made from SUS was held at 20° C. or less, to which the pre-mixed solid catalyst was added under reduced pressure. Further, hydrogen was introduced therein by a differential pressure of 50 mmHg. Then, 780 g of propylene was added under pressure, and the temperature was increased to initiate the polymerization while stirring. The polymerization temperature was kept at 65° C., and the pressure at this stage was 26.0 Kg/cm$^2$G. The polymerization for 30 minutes resulted in 27 g of a polymer, the intrinsic viscosity was 7.5 dl/g.
(Production of propylene-based polymer(B))

Following the production of (A), hydrogen was added by a differential pressure of 5.0 Kg/cm$^2$G, and the temperature was kept at 65° C. to continue the polymerization. The pressure at this stage was 31 Kg/cm$^2$G. The polymerization for 30 minutes resulted in 157 g of polymer in all (polymer composition), and the intrinsic viscosity of the total polymers (polymer composition) was 2.4 dl/g.

From the above results, the polymerization amount of (B) was 130 g, and the intrinsic viscosity was 1.4 dl/g. Accordingly, the weight ratio of (A) to (B) was 17:83, the amount of the polymer formed at the time of producing (A) was 1080 g for every 1 gram of catalyst per hour, while the amount of the polymers formed at the time of producing (B) was 5200 g for every 1 gram of catalyst per hour. Also, the Mw/Mn of the polymer was 11.9.
(Pelletization of the polymer)

Pelletization of the polymer composition was carried out in the same manner as in Example 1. The MFR was 5.0 g/10 min.

Comparative Example 4
(Synthesis of solid catalyst)

A solid catalyst was prepared in the same manner as in Comparative Example 3.
(Preparation of organoaluminum compound)

0.2 mol of triethylaluminum, 0.6 mol of diethylaluminum chloride, and 0.24 mol of ethanol were mixed and kept at 60° C. for 15 minutes.
(Production of propylene-based polymer)

In a polymerization reactor with an internal volume of 300 L made from SUS, while maintaining at 30° C., into 100 L of n-hexane, were added 25.4 g of solid catalyst, 0.8 mol of the above organoaluminun compound (in terms of Al atom), and 0.08 mol of methyl p-toluate, and further was added 15 Kg of propylene. The temperature was increased with stirring, and propylene and hydrogen were supplied so as to keep the polymerization temperature of 65° C., the polymerization pressure of 10 kg/cm$^2$G, and the hydrogen concentration of 24% by volume in the gas-phase part. Thus, the polymerization was carried out for 6.2 hours. After completion of the polymerization, a part of the resulting polymers was subjected to sampling and analyzed. As a result, the intrinsic viscosity was 2.1 dl/g, and the Mw/Mn was 6.4.

(Pelletization of polymer)

Pelletization of the polymer composition was carried out in the same manner as in Example 1. The MFR was 4.9 g/10 min.

Comparative Example 5
(Synthesis of solid catalyst)

A solid catalyst was prepared in the same manner as in Example 1.

(Production of polymer)

In accordance with the production of (B) in Comparative Example 1, the hydrogen concentration was adjusted so that the intrinsic viscosity of a polymer to be obtained became 1.7 dl/g.

(Pelletization of polymer)

Pelletization of the polymer composition was carried out in the same manner as in Example 1. The MFR was 6.2 g/10 min. Also, the Mw/Mn of the polymer was 3.4.

Example 3
(Synthesis of solid catalyst)

A solid catalyst was prepared in the same manner as in Example 1.

(Polymerization)

Polymerization was carried out in the same manner as in Example 1.

(Production of added component((propylene-based polymer (C))

In accordance with the production of (B) in Comparative Example 1, the hydrogen concentration was adjusted so that the intrinsic viscosity of a polymer to be obtained became 1.6 dl/g.

(Pelletization of the polymer)

50% by weight of polymer composition consisting of (A) and (B), and 50% by weight of the propylene-based polymer (C) were mixed to conduct pelletization in the same manner as in Example 1. The pellet obtained had an intrinsic viscosity of 1.8 dl/g, a MFR of 6.4 g/10 min, and a Mw/Mn of 5.7.

Structure of Polymer and Physical Property of Sheet

The results of Examples and Comparative Examples are summarized in Tables 1 and 2. It is shown that the polymer compositions of Examples 1, 2 and 3 are excellent in melt strength, elongation characteristics and fluidity, while those of Comparative Examples 1, 3, and 4 are inferior in elongation characteristics, those of Comparative Examples 2 and 5 are inferior in melt strength, and that of Comparative Example 3 is inferior in appearance of the sample.

Foaming

Into 100 parts by weight of a propylene-based polymer composition, was sufficiently mixed 10 parts by weight of 2.3-fold dilute substance of crystalline polyethylene of composite blowing agent shown as blowing agent and blowing aid described in Japanese Patent Publication (Kokai) No.9-235403(JP-A-09235403). Then, the resulting mixture was subjected to extrusion foaming with a 30 mm φ single-screw extruder or 20 mm φ single-screw extruder mounted with a 1 mm φ strand die. As extrusion conditions, appropriate conditions were used within the range as follows:

cylinder temperature; 150 to 190° C., and die temperature; 160 to 190° C.

The obtained foamed strand was measured for density to determine the expansion ratio, and appearance was visually judged. The results are summarized in Table 3.

The samples of Examples 2 and 3 exhibited good expandability, while the sample of Comparative Example 5 showed non-elevated expansion ratio, and also bad appearance.

TABLE 1

|  |  |  | Example 1 | Example 2 | Example 3 |
|---|---|---|---|---|---|
|  | Catalyst |  | Ti—Mg type | Ti—Mg type | Ti—Mg type |
| First stage polymerization | Intrinsic viscosity | dl/g | 7.5 | 7.4 | 7.5 |
|  | Weight ratio | % by weight | 16 | 15 | 8 |
|  | Ethylene content | % by weight | 0 | 1.5 | 0 |
|  | Polymerization activity | g-PP/g catalyst · h | 4100 | 6800 | 4100 |
| Second stage polymerization | Intrinsic viscosity | dl/g | 1.3 | 1.4 | 1.3 |
|  | Weight fraction | % by weight | 84 | 85 | 42 |
|  | Ethylene content | % by weight | 0 | 4.2 | 0 |
|  | Polymerization activity | g-PP/g catalyst · h | 22000 | 39000 | 22000 |
| Polymer added at the time of kneading | Intrinsic viscosity | dl/g | None | None | 1.6 |
|  | Weight fraction | % by weight |  |  | 50 |
|  | Ethylene content | % by weight |  |  | 0 |
| Final polymer | Intrinsic viscosity | dl/g | 2.3 | 2.3 | 1.8 |
|  | Ethylene content | % by weight | 0 | 3.8 | 0 |
|  | Mw/Mn |  | 4.8 | 5.7 | 5.7 |
|  | MFR | g/10 min | 5.1 | 4.3 | 6.4 |

TABLE 1-continued

|  |  |  | Example 1 | Example 2 | Example 3 |
|---|---|---|---|---|---|
| Physical properties | Coloration | Visual judgement | None | None | None |
|  | Tensile elongation | % | 666 | 896 | 631 |
|  | Melt strength | Draw-down (mm) | 24 | 26 | 86 |
| Evaluation |  |  | Good | Good | Good |

TABLE 2

|  |  | Co. Example 1 | Co. Example 2 | Co. Example 3 | Co. Example 4 | Co. Example 5 |
|---|---|---|---|---|---|---|
|  | Catalyst | Ti—Mg type | Ti—Mg type | TiCl$_3$ type | TiCl$_3$ type | Ti—Mg type |
| First stage polymerization | Intrinsic viscosity | 5.1 | 3.3 | 7.5 | 2.1 | 1.7 |
|  | Percentage by weight | 46 | 10 | 17 | 100 | 100 |
|  | Ethylene | 0 | 0 | 0 | 0 | 0 |
|  | Polymerization activity | 44000 | 108000 | 1080 |  | — |
| Second stage polymerization | Intrinsic viscosity | 0.6 | 1.2 | 1.4 | None | None |
|  | Percentage by weight | 54 | 20 | 83 |  |  |
|  | Ethylene | 0 | 0 | 0 |  |  |
|  | Polymerization acitivty | 52000 | 46000 | 5200 |  |  |
| Polymer added at the time of kneading | Intrinsic viscosity | None | 2.0 | None | None | None |
|  | Percentage by weight |  | 70 |  |  |  |
|  | Ethylene |  | 0 |  |  |  |
| Final polymer | Limiting viscosity | 2.7 | 1.8 | 2.4 | 2.1 | 1.7 |
|  | Ethylene | 0 | 0 | 0 | 0 | 0 |
|  | Mw/Mn | 5.9 | 3.7 | 11.9 | 6.4 | 3.4 |
|  | MFR | 3.0 | 5.8 | 5.0 | 4.9 | 6.2 |
| Physical properties | Coloration | None | None | Present | None | None |
|  | Tensile elongation | 20 | 641 | 17 | 17 | 230 |
|  | Melt strength | 17 | >170 | 38 | 22 | >170 |
| Evaluation |  | Bad | Bad | Bad | Bad | Bad |

TABLE 3

|  | Example 2 | Example 3 | Comparative example 5 |
|---|---|---|---|
| Expansion ratio | About 5.5-fold | About 4.5-fold | About 1.2-fold |
| Appearance | Good | Good | Bad |
| Evaluation | Good | Good | Bad |

Effect of the Invention

The propylene-based polymer of the present invention is excellent in balance of melt strength, elongation characteristics, and fluidity, and is provided by an industrially advantageous method.

What is claimed is:

1. A Propylene-based polymer composition, consisting essentially of crystalline propylene-based polymers (A) and (B), said crystalline propylene-based polymers (A) and (B) being obtained by polymerizing propylene or monomers mainly comprised of propylene to produce said crystalline propylene-based polymer (A) having an intrinsic viscosity of 5 dl/g or more in the first stage, and successively polymerizing propylene or monomers mainly comprised of propylene to produce said crystalline propylene-based polymer (B) having an intrinsic viscosity of less than 3 dl/g in the second stage, wherein the content of said propylene-based polymer(A) in the total propylene-based polymers (A) and (B) is in the range of 0.05% by weight or more and less than 25% by weight, the intrinsic viscosity of the total propylene-based polymer (A) and (B) is less than 3 dl/g, and the ratio of a weight average molecular weight to a number average molecular weight of the total propylene-based polymers (A) and (B) is less than 10.

2. The propylene-based polymer composition according to claim 1, wherein the intrinsic viscosity of the (A) and the content of said (A) satisfy the following expression:

(A) content (% by weight)≧400×EXP(−0.6× the intrinsic viscosity (dl/g) of (A)).

3. The propylene-based polymer composition according to claim 1, wherein the polymerization is carried out using a solid catalyst containing Ti, Mg, and halogen as essential components, and the rate of polymerization at the time of production of (A) is 2000 g or more per gram of catalyst per hour, while the rate of polymerization at the time of production of (B) is two times or more the rate of polymerization at the time of production of (A).

4. The propylene-based polymer composition according to claim 1, wherein said (A) and (B) are respectively any of a hompolymorer of propylene, a random copolymer of propylene and 10% by weight or less of ethylene, a random copolymer of propylene and 30% by weight or less of an α-olefin having 4 to 12 carbon atoms, and random copolymer of propylene, 10% by weight or less of ethylene and 30% by weight or less of an α-olefin having 4 to 12 carbon atoms.

5. The propylene-based polymer composition according to claim 4, wherein said α-olefin having 4 to 12 carbon atoms is 1-butene.

6. The propylene-based polymer composition according to claim 1, wherein the intrinsic viscosity of said (A) is 7 dl/g or more.

7. The propylene-based polymer composition according to claim 1, wherein said (A) has an ethylene content in the range of 1% by weight to 10% by weight.

8. The propylene-based polymer composition according to claim 1, wherein the intrinsic viscosity of the total polymers is less than 2 dl/g.

9. A propylene polymer composition consisting essentially of the propylene-based polymer composition of claim 1 and a propylene-based polymer(C) other than the propylene-based polymer composition, having an intrinsic viscosity of less than 3 dl/g, and having an intrinsic viscosity of less than 3 dl/g and a Mw/Mn of less than 10, and the content of the (A) in the total of (A), (B) and (C) is 0.05% by weight or more and less than 20% by weight.

10. The propylene polymer composition according to claim 9, wherein the intrinsic viscosity is less than 2 dl/g.

11. The propylene polymer composition according to claim 9, wherein the propylene-based polymer(C) is a propylene-based polymer obtained by polymerizing propylene or monomers mainly composed of propylene with a solid catalyst containing Ti, Mg, and halogen as essential components in single stage polymerization.

12. The propylene polymer composition according to claim 9, wherein the intrinsic viscosity of the (A) and the content of said (A) satisfy the following expression:

(A) content (% by weight) $\geq 400 \times EXP(-0.6 \times$ the intrinsic viscosity (dl/g) of (A)).

13. The propylene polymer composition according to claim 9, wherein the intrinsic viscosity of said (A) is 7 dl/g or more.

14. A foamed article made from the propylene-based polymer composition of claim 1.

15. A foamed article made from the propylene polymer composition of claim 9.

* * * * *